Figure 5:
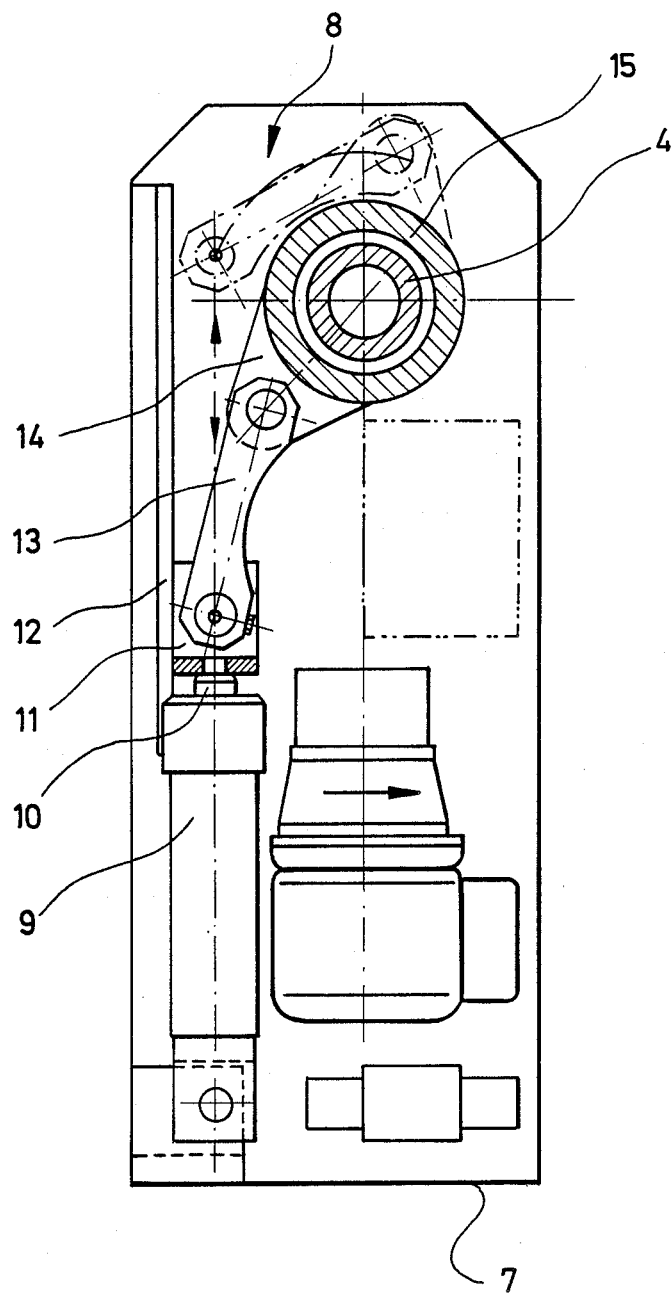

United States Patent [19]

Zinser

[11] Patent Number: 4,953,262

[45] Date of Patent: Sep. 4, 1990

[54] MACHINE FOR PROCESSING MEAT

[75] Inventor: Georg Zinser, Winterstettenstadt, Fed. Rep. of Germany

[73] Assignee: Albert Handtmann, Maschinenfabrik GmbH & Co. KG, Biberach an der Riss, Fed. Rep. of Germany

[21] Appl. No.: 332,072

[22] Filed: Apr. 3, 1989

[30] Foreign Application Priority Data

Apr. 18, 1988 [DE] Fed. Rep. of Germany ....... 3812931

[51] Int. Cl.$^5$ ................................................ A22C 5/00
[52] U.S. Cl. ........................................ 17/1 R; 17/24; 254/3 R
[58] Field of Search ...................... 17/1 R, 24, 35, 25; 254/2 R, 3 R; 414/680, 222, 228, 639

[56] References Cited

U.S. PATENT DOCUMENTS 3,838,783 10/1974 Tune .................................. 254/3 R
4,280,784 7/1981 Ramacciotti ............................ 17/24
4,791,705 12/1988 Corominas ............................ 17/25

Primary Examiner—Willis Little
Attorney, Agent, or Firm—Finnegan, Henderson, Farabow, Garrett & Dunner

[57] ABSTRACT

The invention relates to a machine for processing meat, particularly sausage meat, comprising a supply hopper disposed on top of the machine, a lift arm pivotably mounted on a horizontal axle fixedly connected to the machine, a horizontal tipping shaft rotatably mounted on said lift arm, and a carrier frame for a mobile sausage meat container secured to said tipping shaft. In order to improve a machine of the type defined above in a manner ensuring safe and reliable raising of the lift arm and tipping of the sausage meat container, the invention provides that between the lift arm axle fixedly connected to the machine and the tipping shaft there is provided a first chain transmission having a transmission ratio of 1:1 for guiding the sausage meat container parallel to itself during raising and lowering of the lift arm, and a second cross-connected chain transmission having a transmission ratio greater than 1 for tipping the sausage meat container, the driving sprockets of said chain transmissions being freely rotatable on the fixed lift arm axle and adapted to be alternately coupled thereto, whereas the driven sprockets of the two chain transmissions are non-rotatably secured to the tipping shaft.

14 Claims, 6 Drawing Sheets

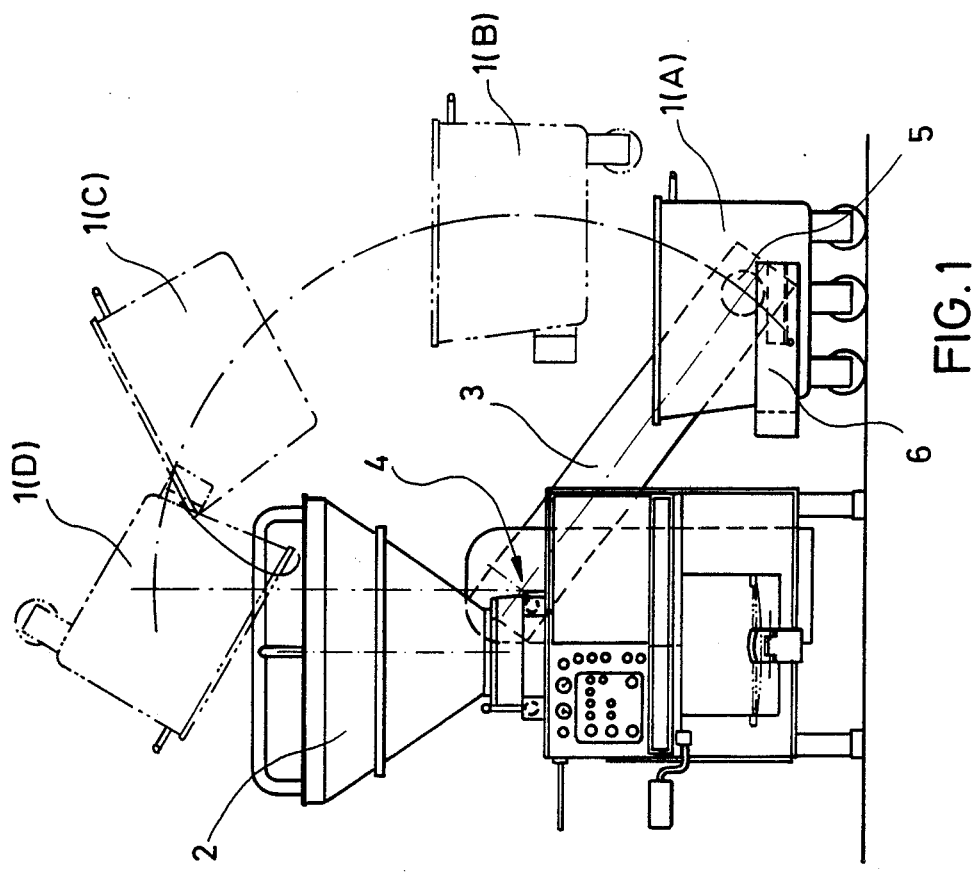
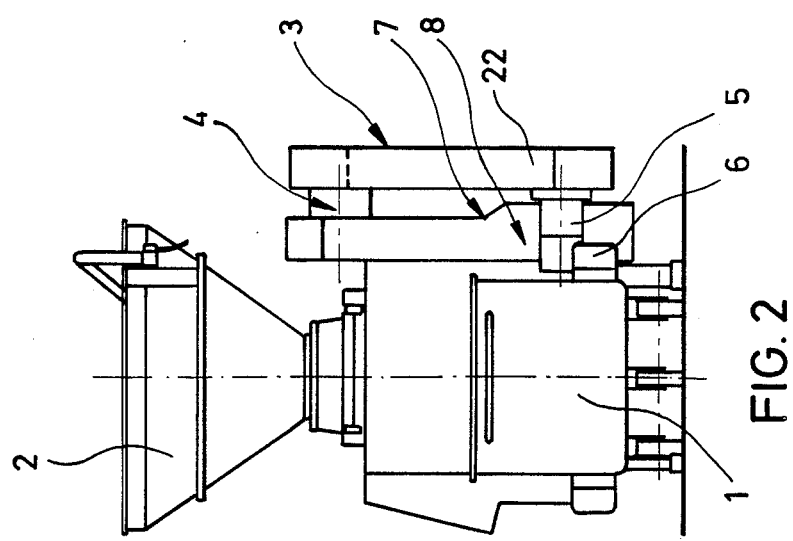

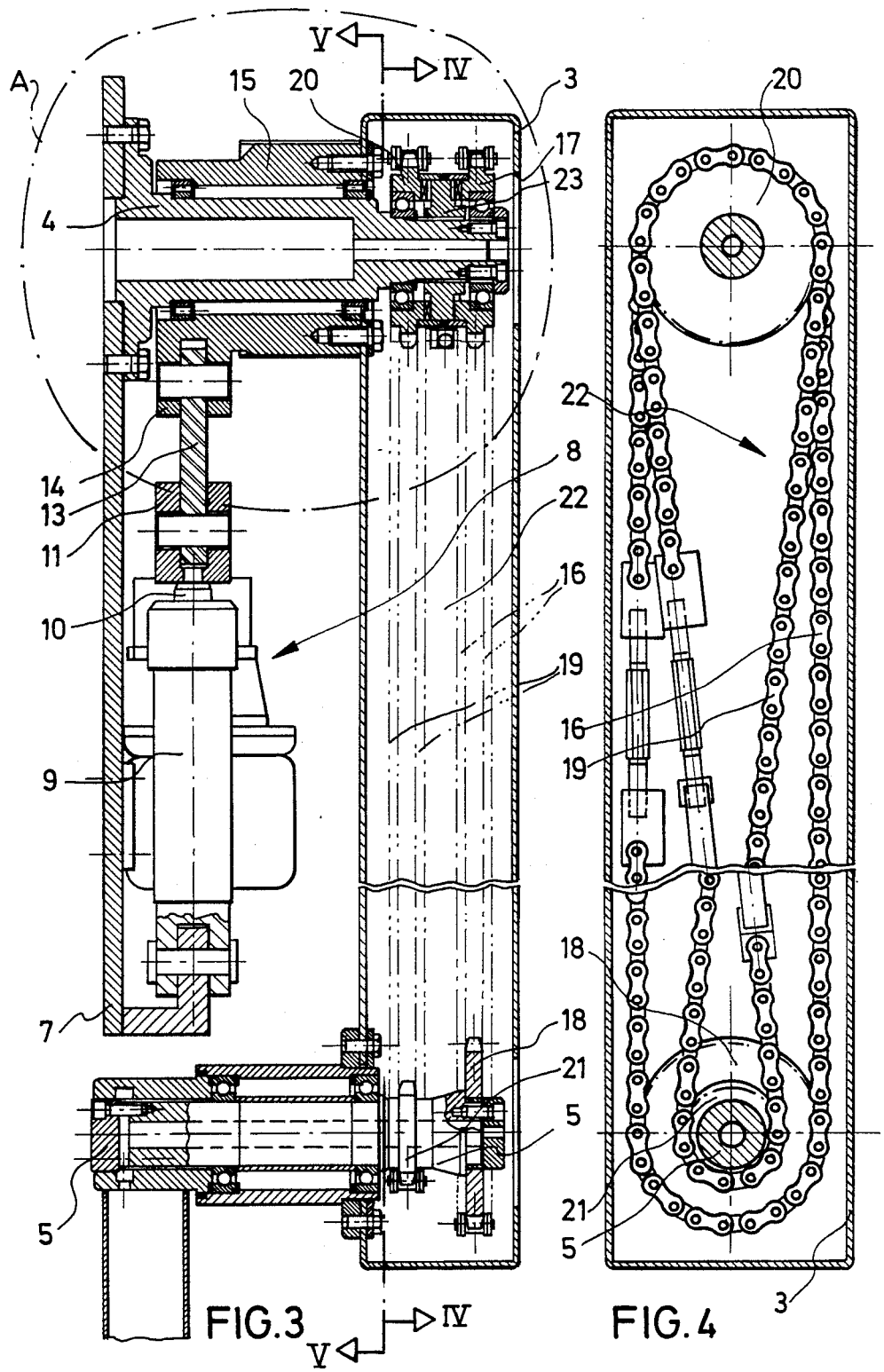

MACHINE FOR PROCESSING MEAT

The invention relates to a machine for processing meat, particularly sausage meat, comprising a supply hopper supported on top of the machine, a lift arm mounted for pivoting about a horizontal axle at a fixed position on the machine and carrying a horizontal rotatable tipping shaft, and a carrier frame for a mobile sausage meat container secured to said tipping shaft for rotation in unison therewith.

Known from practical use are machines of this type which are designed for processing great amounts of minced meat or sausage meat per time unit, particularly high-performance machines for metering sausage meat and finishing continuous strings of sausages. This requires the use of voluminous sausage meat containers, which are filled with the sausage meat, wheeled on the floor into position, lifted and finally emptied into the supply hopper. Due to the considerable weight of the sausage meat held in the containers, the lifting, tipping and subsequent lowering of the sausage meat containers cannot be done by hand, but has rather to be carried out by mechanical means.

In this context it has to be ensured that the sausage meat container has initially to be lifted in an upright position to thereby prevent premature outflow of the suasage meat contained therein. The tipping of the sausage meat container may only be initiated at a certain lifting height. In known machines the tipping of the sausage meat container is brought about by a stop member which is engaged by for instance an upper rim of the sausage meat container as the latter is being lifted, causing the sausage meat container to be tipped in the direction towards the supply hopper.

Particularly in the case of high-performance machines, the abutment of the sausage meat container on the stop member occurs very abruptly due to the high lifting speed of the lift arm, resulting in a correspondingly abrupt tipping of the sausage meat container or even in an oscillating movement thereof, and consequently in a premature outflow of the sausage meat, particularly in the case of a relatively thin-bodied sausage meat as for instance veal sausage meat. There is moreover the danger that the stop member is broken after prolonged use, resulting in malfunction of the machine or even accidents. It is also practically impossible to constantly and reliably lift the sausage meat container parallel to itself, and to selectively adjust the initiation of the tipping operation and the execution thereof, i.e. the coordination of the tipping angle with determined lift positions.

It is an object of the invention to improve a machine of the type defined in the introduction in a manner capable of ensuring safe and reliable lifting of the lift arm and tipping of the sausage meat container.

This object is attained according to the invention in a machine of the type defined above, wherein between the lift arm axle and the tipping shaft there is provided a first chain transmission having a transmission ratio of 1:1 for guiding the sausage meat container parallel to itself as said lift arm is being raised and lowered, and a second cross-connected chain transmission having a transmission ratio greater than 1 for causing the sausage meat container to be tipped, the driving sprockets of the chain transmissions being mounted on the lift arm axle for free rotation thereabout, and adapted to be alternately coupled thereto for rotation therewith, while the driven sprockets are non-rotatably secured on the tipping shaft.

When a stationary sprocket is connected to a rotatable sprocket by a straight-connected chain transmission, a rotation of the latter about the former will result in a rotation of the latter about its axis in a direction opposite to the direction of its rotation about the stationary sprocket. In the case of a cross-connected chain transmission, the rotation of the rotatable sprocket will be in the same direction as its rotation about the stationary sprocket. In the present case the transmission ratio between the sprockets of the first, straight-connected chain transmission is 1:1, so that the movable sprocket, i.e. the driven sprocket is rotated at a ratio of 1:1 with respect to its angular displacement, and thus to the raising of the lift arm, although in the opposite direction, as a result of which the two movements cancel each other, so that the driven sprocket will not alter its angular position relative to its axis during its angular displacement about the driving sprocket. In this manner the sausage meat container is displaced parallel to itself as the lift arm is being raised and lowered. This is based on the condition that the driving sprocket of the first chain transmission is coupled to the fixed axle of the lift arm, but not to the driving sprocket of the second chain transmission. When, however, the driving sprocket of the first chain transmission is uncoupled from the fixed lift arm axle, and the driving sprocket of the second chain transmission is coupled thereto in place thereof, the first chain transmission is rendered inoperative and, due to the selected transmission ratio of more than 1 and the cross-connection of the second chain transmission, the rotary movement of the driven sprocket of the second chain transmission is added to its angular displacement, resulting in the driven sprocket of the secong chain transmission being rotated in the direction of the angular displacement of the lift arm. In this manner the sausage meat container is tipped towards the supply hopper to empty the sausage meat thereinto.

As a result, during the lifting and lowering operations the sausage meat container is guided in such a manner that it is accurately and constantly displaced parallel to itself, and that its tipping movement can be initiated at a predetermined instant by locking the corresponding drive sprocket on the lift arm axle, and can be carried out in an optimized sequence of movements without the danger of oscillation or excessive tipping which might cause premature outflow of the sausage meat. The elimination of fixed stop members reduces the danger of accidents. The replacement of corresponding sprockets permits the tipping operation of the sausage meat container and its tipping angle to be selectively adjusted or optimized. In this manner it is possible to coordinate the operation of the machine according to the invention with the consistency and flow characteristics of the sausage meat to be processed.

In order to provide a simple construction, the two driving sprockets and one of the driven sprockets may advantageously have the same number of teeth, while the driven sprocket of the second chain transmission may have a smaller number of teeth than the other sprockets.

The two driving sprockets are advantageously mounted on the fixed lift arm axle at spaced locations, with an axially shiftable clutch disc being disposed therebetween and non-rotatably mounted on the fixed axle.

In a preferred embodiment, the two sides of the clutch disc and the sides of the driving sprockets facing the clutch disc are formed with complementary toothed axial end faces, the maximum width of the clutch disc substantially corresponding to the clear spacing between the two driving sprockets. The clutch disc permits the driving sprockets to be operatively coupled to and uncoupled from the fixed lift arm axle in a simple manner. The width of the clutch disc is to be selected so that at no time both driving sprockets are uncoupled from the fixed lift arm axle. In this manner it is ensured that the sausage meat container will always assume an accurately determined position.

In this context the toothed axial end faces are advantageously formed with flat-topped saw-teeth, the inclined flanks of the saw-teeth of the toothed axial end faces in mutual engagement of the clutch disc and a respective one of the driving sprockets extending in the direction of a force created in the respective driving sprocket, the flat tops of the saw-teeth on the other side of the clutch disc being at that time supported on the flat tops of the saw-teeth in the other of the two driving sprockets, the saw-teeth of the toothed axial end faces being formed at different spacings, so that mutual engagement of two toothed end faces facing one another is only possible at predetermined positions relative to one another.

The above-mentioned force may be a tractive force exerted by the respective chain transmission on the driving sprocket engaged with the clutch disc as the lift arm is being raised or lowered, and is effective to automatically shift the clutch disc into engagement with the other one of the two driving sprockets.

The mentioned force may also be a thrust force resulting from the mutual abutment of two stop members secured to respective ones of the two driving sprockets, the mutual abutment of the two stop members at the end of a relative movement of the two driving sprockets with respect to one another being effective to positively shift the clutch disc.

In a preferred embodiment, the driving sprocket and/or the driven sprocket of at least one of the two chain transmissions is angularly adjustable on its axle or shaft, respectively. A suitable angular adjustment permits the timing of the shifting from one of the chain transmissions to the other to be optimized with regard to existing operating conditions.

According to another advantageous aspect of the invention, the lift arm may be hollow, in which case the two chain transmissions including their sprockets, axle and shaft, respectively, may be housed in the hollow interior of the lift arm. This is effective to exclude any danger of injury to the operator and to ensure trouble-free and reliable operation of the machine.

The carrier frame is advantageously designed for positively locked engagement with the sausage meat container.

In order to permit the lift arm to be raised and lowered in a simple and reliable manner, the end of the lift arm adjacent the machine may be secured to a hollow shaft enveloping the fixed lift arm axle and having its end connected to a crank arm itself connected to the piston rod of a hydraulic cylinder-piston unit.

In a preferred embodiment, a pivot lever is provided between the crank arm and the end of the piston rod. This results in a rugged and space-saving construction of the cylinder-piston unit nevertheless capable of ensuring a sufficient pivot angle of the lift arm.

For absorbing the tilting forces exerted on the end of the piston rod by the pivot lever as the piston rod is being extended, a slide member may be provided between the pivot lever and the end of the piston rod, this slide member cooperating with a vertcal guide secured to the machine.

The drive mechanism for the lift arm is preferably disposed in a drive mechanism housing mounted on the machine and having an end of the hollow shaft projecting thereinto. The advantages achieved thereby are similar to those achieved by the hollow construction of the lift arm.

Figure 6:
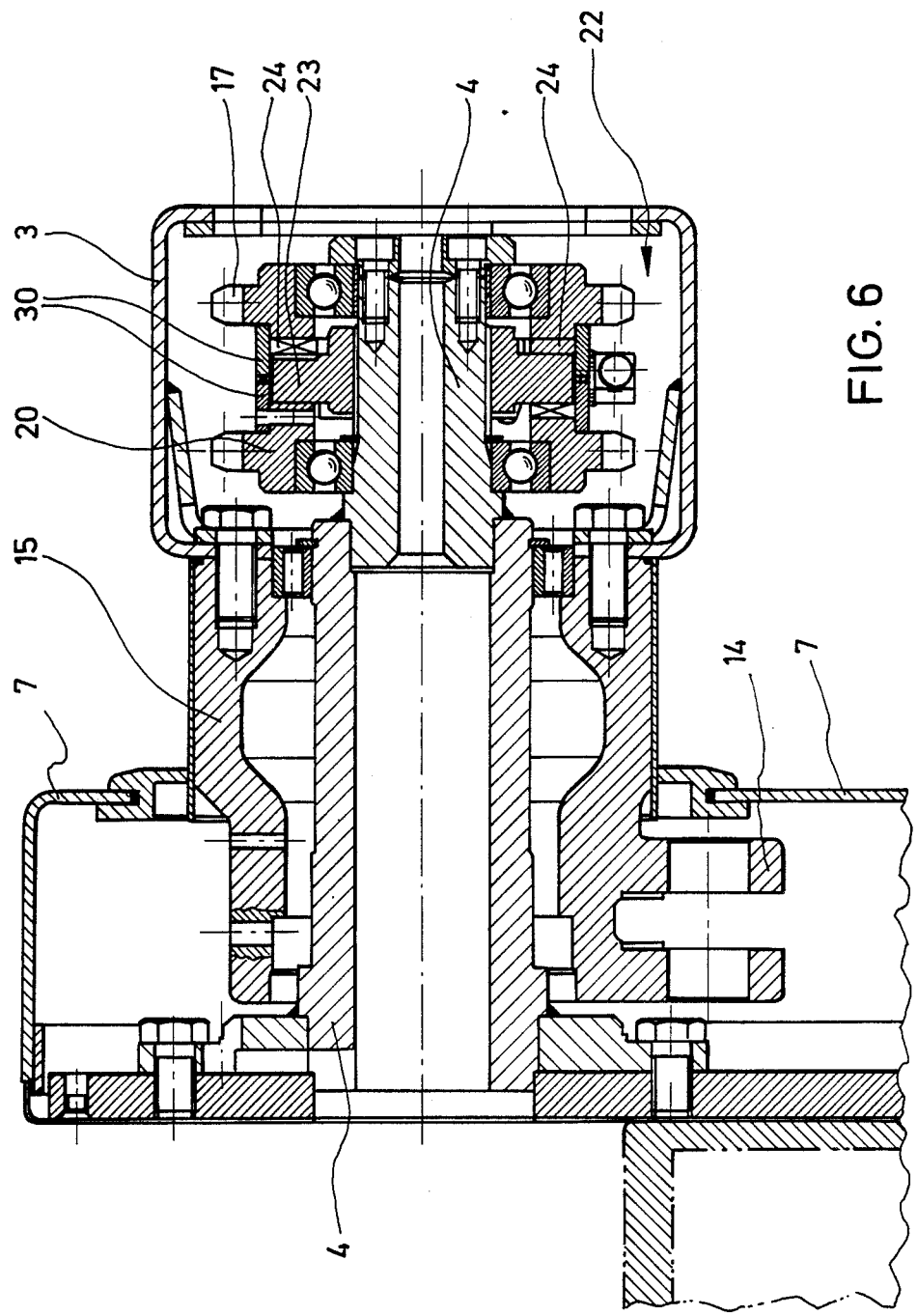
Figure 7A:
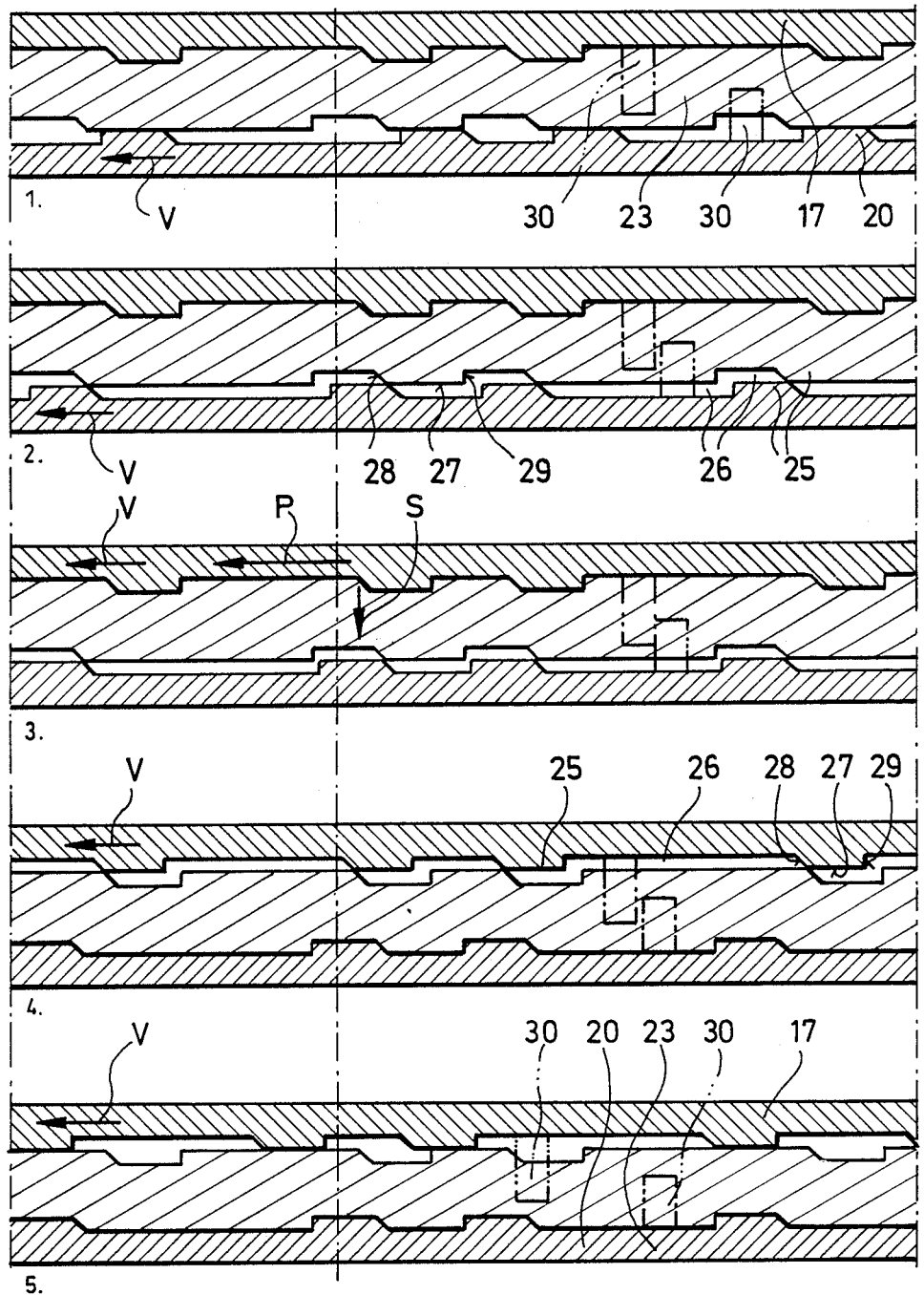
Figure 7B:
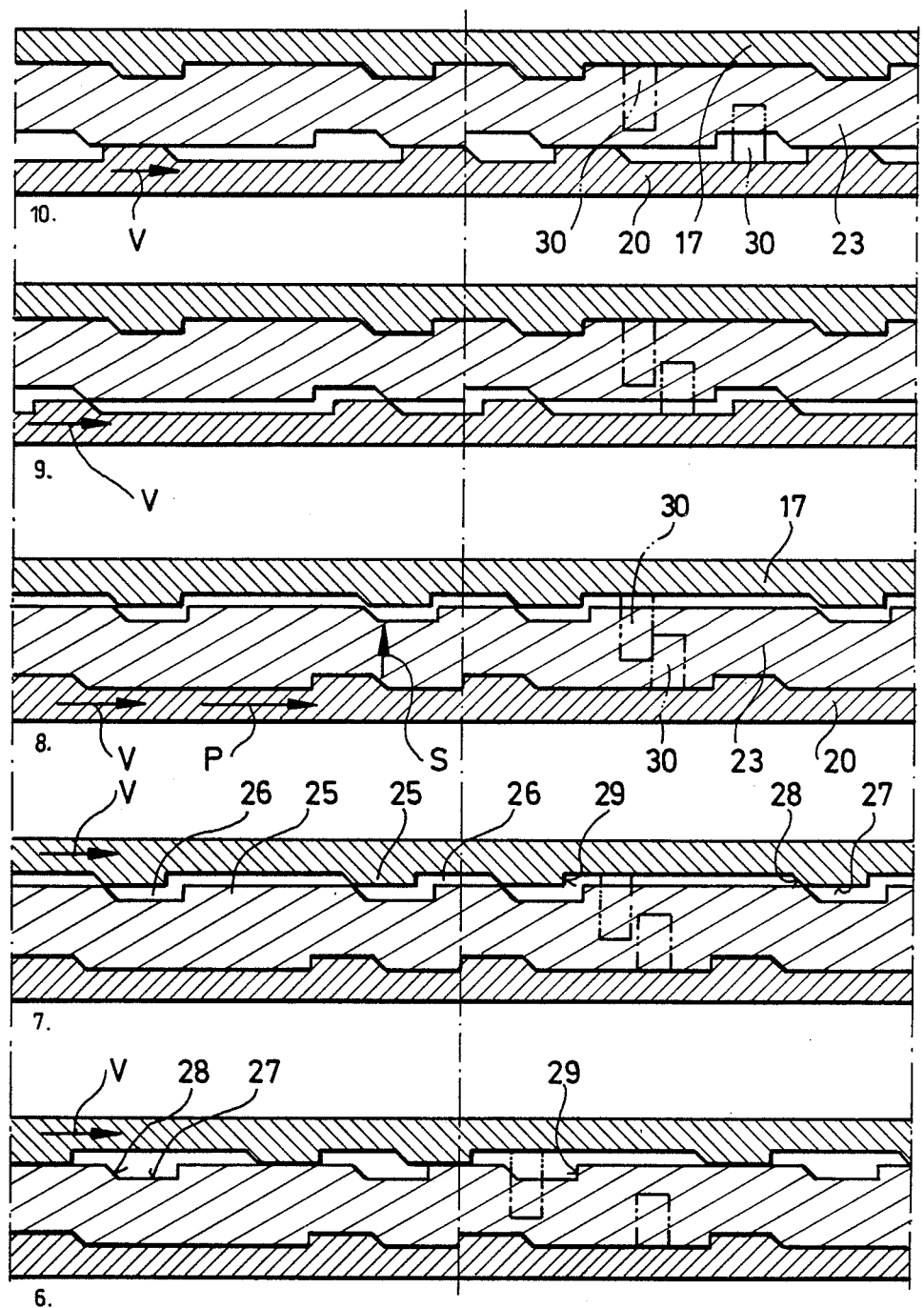

A preferred embodiment of the invention shall now be described by way of example with reference to the accompanying drawings, wherein:

FIG. 1 shows a lateral elevation of the preferred embodiment of the machine according to the invention, FIG. 2 shows an end view of the machine shown in FIG. 1 as viewed from the right in FIG. 1, FIG. 3 shows a longitudinally sectioned view of a lift arm of the machine shown in FIGS. 1 and 2, together with a drive mechanism therefor, FIG. 4 shows a sectional view taken along the line IV—IV in FIG. 3, FIG. 5 shows a sectional view taken along the line V—V in FIG. 3, FIG. 6 shows an enlarged illustration of the detail designated "A" in FIG. 3, and FIGS. 7A and 7B show developed views of toothed end faces of the driving sprockets of chain transmissions disposed within the lift arm and of a clutch disc disposed between these sprockets, at different stages of the lifting movement of the lift arm.

The drawings show a preferred embodiment of the machine according to the invention for processing meat, particularly sausage meat, which is emptied from a sausage meat container 1 into a supply hopper 2 disposed on top of the machine, and then successively processed within the machine. For lifting the sausage meat container 1 from the floor to supply container 2 and for subsequently lowering it back to the floor, the machine is provided with a lift arm 3 mounted at one end for rotation about a horizontal lift arm axle 4 fixedly disposed on the machine, the opposite free end of lift arm 3 carrying a rotatably mounted horizontal tipping shaft 5 having a carrier frame 6 secured thereto for carrying sausage meat container 1 in a positively locked manner. Lift arm 3 is adapted to be raised and lowered by a drive mechanism 8 enclosed in a drive mechanism housing 7 secured to the machine.

Lift arm 3 is operable in the manner shown in FIG. 1 to lift sausage meat container 1 from a starting position A resting on the floor, along an arcuate path to an end position D above supply hopper 2, and to subsequently lower it back to the floor. As sausage container 1 is being lifted, it is maintained parallel to itself, or to the floor, respectively, i.e. in a substantially horizontal position, up to an intermediate position B, and subsequently tipped towards the machine during the end phase of the lifting operation. In the position designated C, sausage meat container 1 has already been lifted somewhat beyond intermediate position B, and the tipping operation has been initiated. In end position D, sausage meat container 1 has been finally tipped to a position causing the sausage meat contained therein to flow into supply hopper 2. As lift arm 3 is being lowered, sausage meat container 1 assumes the described positions in reverse sequence.

As shown in FIGS. 3 and 5, drive mechanism 8 for lift arm 3 comprises a double-acting hydraulic piston-cylinder unit 9 anchored in the lower half of drive mechanism housing 7 fixedly secured to the machine. A piston rod 10 projecting from the upper end of cylinder-piston unit 9 has its free end secured to a slide member 11 cooperating with a vertical guide 12 fixedly secured to drive mechanism housing 7 at a stationary position with respect to the machine. A pivot lever 13 is provided to establish an articulated linkage between slide member 11 and a crank arm 14. The latter is secured to one end of a hollow shaft 15 coaxially enveloping lift arm axle 4 and secured at its outer end facing away from the machine to lift arm 3. This construction is effective to convert the linear up and down movement of piston rod 10 into a rotary movement of hollow shaft 15 and thus in arcuate raising and lowering movements of lift arm 3. The interposition of pivot lever 13 permits cylinder-piston unit 9 to be rigidly secured over its full length, resulting in a rugged and space-saving construction while ensuring a sufficient pivoting arc of crank arm 14. The tilting forces acting on the upper end of piston rod 10 as it is being extended are transmitted to vertical guide 12 through slide member 11.

For maintaining sausage meat container 1 parallel to itself during the movement of lift arm 3 along its arcuate path and for subsequently tipping the sausage meat container, there is provided a first chain transmission 16 having a driving sprocket 17 and a driven sprocket 18, and a second chain transmission 19 having a driving sprocket 20 and a driven sprocket 21. Both chain transmissions 16,19 including their driving and driven sprokets 17,18,20,21 are housed in the hollow interior 22 of hollow lift arm 3 as shown in FIGS. 3 and 4.

First chain transmission 16 is of the straight-connected type with a transmission ratio of 1:1 and is effective to maintain sausage meat container 1 parallel to itself as lift arm 3 is raised and lowered. Secong chain transmission 19 is of the cross-connected type with a transmission ratio greater than 1, and is provided for tipping sausage meat container 1 as lift arm 3 is raised and lowered. Driving sprockets 17 and 20 of both chain transmissions 16 and 19 are freely rotatable on an end portion of fixed lift arm axle 4 extending coaxially through hollow shaft 15 and projecting into the hollow interior 22 of lift arm 3. Driven sprockets 18,21 of both chain transmissions 16,19 are fixedly secured to an end portion of tipping shaft 5 likewise projecting into the hollow interior 22 of lift arm 3. Both driving sprockets 17,20 and driven sprocket 18 of first chain transmission 16 have the same number of teeth, whereas driven sprocket 21 of second chain transmission 19 has a smaller number of teeth than the other sprockets 17,18,20. As shown in FIG. 3, first chain transmission 16 is disposed farther away from the machine than second chain transmission 19 in the hollow interior 22 of lift arm 3.

The two driving sprockets are mounted for free rotation on fixed lift arm axle 4 at spaced locations. Disposed between the two driving sprockets is a clutch disc 23 which is mounted on fixed lift arm axle 4 by a splined connection permitting its axial displacement while preventing it from being rotated.

Both sides of clutch disc 23 and the sides of driving sprockets 17,20 facing towards clutch disc 23 are formed with complementary toothed axial end faces 24 as indicated in FIG. 6. Toothed end faces 24 permit a selective one of driving sprockets 17 or 20 to be coupled to clutch disc 23 and to be thereby prevented from being rotated relative to fixed lift arm axle 4.

As shown by the developed views in FIGS. 7A and 7B, the toothed end faces 24 on both sides of clutch disc 23 and or the inwards facing sides of driving sprockets 17 and 20 are each formed with a plurality of flat-topped teeth 25 separated from one another by respective recesses 26. The flat top 27 of each saw-tooth 25 is connected to the respective recess 26 by an inclined flank 28 on one side, as seen in the circumferential direction, and on the other side by a radial face 29 extending perpendicular to the plane of clutch disc 23 and of driving sprockets 17,20, respectively (for simplicity's sake only the boundary faces 27, 28 and 29 of saw-teeth 25 are considered in the present description).

The toothed end faces 24 are designed with a variable pitch, so that their saw-teeth 25 and recesses 26 are aligned opposite one another only in a predetermined position of the end faces 24 relative to one another for mutual engagement. The width of clutch disc 23 is determined so that the flat tops 27 of saw-teeth 25 on one of its sides are supported on the flat tops 27 of saw-teeth 25 of one driving sprocket 17 or 20 when the toothed end face 24 on its other side is in full engagement with the other driving sprocket 20 or 17, respectively. In this manner it is ensured that clutch disc 23 is at any time in full engagement with only one of the two driving sprockets, and at the same time that free rotation of both driving sprockets on fixed lift arm axle 4 is prevented.

Secured to each driving sprocket 17,20 radially outwards of clutch disc 23 is an axially extending stop member 30 projecting towards the opposite driving sprocket. The length of stop members 30 is selected to result in mutual abutment in response to rotation of driving sprockets 17 and 20 relative to one another. Their location on the respective driving sprockets is selected to result in their mutual abutment when the toothed end faces 24 of clutch disc 23 and the driving sprocket not in full engagement therewith are in their above defined predetermined positions relative to another permitting clutch disc 23 to be axially displaced into full engagement of the two toothed end faces. The mutual abutment of stop members 30 results in the movement V of the driving sprocket rotating relative to clutch disc 23 being transmitted to the other driving sprocket actually engaged with clutch disc 23 and thus non-rotatably locked on fixed lift arm axle 4. The inclined flanks 28 of saw-teeth 25 extend in the direction of the thus created thruft force P and are effective to convert part of this force P into an axially directed thruft force S resulting in the axial displacement of clutch disc 23 into full engagement with the opposite driving sprocket. In the present example the axial displacement of clutch disc 23 and thus the transition of the movement of sausage meat container 1 between the parallel movement phase and the tipping phase is thus brought about by a positive switching action.

In this embodiment clutch disc 23 is of a width permitting it to be at any time fully engaged with driving sprocket 17 or driving sprocket 20, but not with both driving sprockets at the same time.

The operation of the machine according to the invention shall now be explained with reference to FIGS. 7A and 7B, showing ten developed views 1 to 10 of clutch disc 23 in ten different positions relative to driving sprockets 17 and 20, corresponding to ten different angular positions of lift arm 3.

In the first place a sausage meat container 1 filled with sausage meat is wheeled to a position adjacent the machine according to the invention to replace an empty sausage meat container and to be positively locked to tipping shaft 5 of lift arm 3. Sausage meat container 1 is then in the starting position designated A in FIG. 1.

Cylinder-piston unit 9 is then operated to extend piston rod 10, pivot lever 13, crank arm 14 and hollow shaft 15 acting to transmit this movement of piston rod 10 to lift arm 3, so that the latter is raised, in the counter-clockwise direction as seen in FIG. 1, to lift sausage meat container 1 while maintaining it parallel to itself. In the course of this movement, sausage meat container 1 passes through the intermediate position designated B in FIG. 1. The developed view 1 in FIG. 7A shows the position of clutch disc 23 relative to driving sprockets 17 and 20 corresponding to the intermediate position B of sausage meat container 1. On one side of clutch disc 23, the flat tops 27 of its saw-teeth 25 are supported on the flat tops 27 of the saw-teeth on driving sprocket 20 of second chain transmission 19, while the other side of clutch disc 23 is in full engagement with driving sprocket 17 of first chain transmission 16. This driving sprocket 17 is thus non-rotatably connected to fixed lift arm axle 4, as a result of which, and due to the straight-connected construction and 1:1 transmission ratio of first chain transmission 16, the associated driven sprocket 18 is rotated about an angle corresponding to the angular path of lift arm 3 and in the opposite direction, so that its angular position with respect for instance to the horizontal does not change during this period of full engagement, as already pointed out in the introduction to the description. In this manner sausage meat container 1 is lifted in an upright position parallel to itself. Tipping shaft 5, driven sprocket 21 and second chain transmission 19 cooperate to transmit this rotary movement of driving sprocket 18 to driving sprocket 20, causing the latter to rotate in the direction of arrow V due to the cross-connection and the transmission ratio of second chain transmission 19.

As a result of this rotary movement, stop member 30 of driving sprocket 20 approaches the position shown in the developed view 2 in FIG. 7A, in which saw-teeth 25 and recesses 26 of clutch disc 23 are aligned approximately opposite recesses 26 and saw-teeth 25, respectively, of driving sprocket 20, so that further rotation of driving sprocket 20 will bring the respective toothed end faces 24 to their predetermined relative positions permitting clutch disc 23 to be fully engaged with driving sprocket 20.

This position is illustrated in the developed view 3. This full engagement is brought about at this instant by the abutment of stop member 30 of the rotating driving sprocket 20 with stop member 30 of the other driving sprocket 17, which is still in full engagement with clutch disc 23 and thus non-rotatably connected to fixed lift arm axle 4. The inclined flanks 28 of saw-teeth 25 are effective to convert part of the thus created thrust force P into an axially directed thrust force S for the axial displacement of clutch disc 23 towards the opposite driving sprocket 20. As a result, clutch disc 23 is released from its engagement with driving sprocket 17 and successively engaged with driving sprocket 20, as shown in the developed view 3, to finally arrive at the fully engaged position with driving sprocket 20 as depicted in the developed view 4. As a result of this full engagement, driving sprocket 20 is non-rotatably connected to fixed lift arm axle 4. Due to the cross-connected construction of second chain transmission 19 and its transmission ratio, the further angular movement of lift arm 3 results in an oppositely directed rotation of the associated driven sprocket 21 at an increased speed, and thus in a tipping of sausage meat container 1 towards supply hopper 2. Tipping shaft 5, driven sprocket 18 and first chain transmission 16 cooperate to transmit the rotary movement of driven sprocket 21 to driving sprocket 17, so that the latter is rotated in the direction indicated by arrow V.

The developed view 3 thus illustrates the initial phase, and developed view 4 the final phase of the shifting operation from the lifting of sausage meat container 1 parallel to itself to its tipping movement. This shifting operation is carried out in a position of sausage meat container 1 intermediate between the two positions B and C thereof shown in FIG. 1.

Further upward movement of lift arm 3 results in further rotation of driving sprocket 17 to the position shown in developed views 5 and 6, in which the flat tops 27 of the saw-teeth 25 of clutch disc 23 are supported on the flat tops 27 of the saw-teeth 25 of driving sprocket 17. At the same time piston rod 10 of cylinder-piston unit 9, and thus lift arm 3, arrive at their respective end positions corresponding to the end position of pivot lever 13 shown in phantom lines in FIG. 5. This end position corresponds to the end position of sausage meat container 1 indicated at D in FIG. 1. This position of sausage meat container 1 permits the sausage meat contained therein to flow into supply hopper 2 for processing within the machine.

As soon as sausage meat container 1 has been emptied, drive mechanism 8 is reversed to retract piston rod 10 into cylinder-piston unit 9, to thereby initiate the lowering movement of lift arm 3 and reverse the rotation of driving sprocket 20. The rotation of the latter is indicated by the arrow V in developed view 6.

The switching operation from the tipping movement of sausage meat container 1 to its parallel displacement during the lowering of lift arm 3 is carried out in the same manner as the switching operation during its upward movement, although in the reverse sequence. The positions of clutch disc 23 and driving sprockets 17 and 20 relative to one another, the mutual abutment of the two stop members 30, the resulting thrust forces P and S, and the change-over of the rotary movement from one driving sprocket to the other during this lowering operation are depicted in developed views 6 to 10 in FIG. 7B. A detailed description of developed views 6 to 10 will not be required by those skilled in the art, since they correspond to developed views 5 to 1, with the movements of the driving sprockets and the thrust forces P and S directed in the opposite sense. Developed view 8 for instance shows the reversal of the switching operation from the parallel lifting of sausage meat container 1 to its tipping as depicted in FIG. 3, thus the switching operation from the tipping movement to the straight lowering movement.

When lift arm 3 has reached its lower end position, sausage meat container 1 is again at its starting position, in which it is removed from tipping shaft 5 to be replaced by a full sausage meat container preparatory to starting another operating cycle as described above.

In practical operation it may occur that a sausage meat container is not evenly filled with the sausage meat, resulting in the center of gravity of the filled container being displaced out of alignment with tipping shaft 5. As the thus filled sausage meat container is lifted off the floor, this uneven filling results in a rightwards or leftwards directed tipping moment about the tipping axis and thus in a correspondingly directed force acting on the first chain transmission 16 during the straight lifting phase. Neither of these forces will result, however, in a premature switch-over from the straight lifting to the tipping movement of the sausage meat container. In the case of a force acting on driving sprocket 17 towards the right in the developed views of FIGS. 7A and 7B, the sprocket is supported on the radial faces 29 of the saw-teeth of clutch disc 23, so that the latter is not subjected to any axial thrust force acting thereon. The switching operation is initiated at the correct instant by the mutual abutment of the two stop members 30. In the case of a force acting on driving sprocket 17 towards the left, the sprocket is supported on the inclined faces 28. The resulting axial thrust force will only be effective to initiate the switching operation, however, when the toothed end faces are in the predetermined position relative to one another as shown in developed view 3 in FIG. 7A.

There is also the possibility of performing the switching operation from the straight lifting movement to the tipping movement without using the stop members by designing the sausage meat container so that its center of gravity in the properly filled state is out of alignment with tipping shaft 5 to result in a tipping moment about the tipping axis in the direction of the inclined flanks 28, and thus in a force acting on the driving sprocket 17 towards the left.

I claim:

1. A machine for processing meat, particularly sausage meat, comprising a supply hopper supported on top of the machine, a lift arm mounted for pivoting about a horizontal axle at a fixed position on the machine and carrying a horizontal rotatable tipping shaft, and a carrier frame for a mobile sausage meat container secured to said tipping shaft for rotation in unison therewith, characterized in that between said lift arm axle (4) and said tipping shaft (5) there is provided a first chain transmission (16) having a transmission ratio of 1:1 for guiding said sausage meat container (1) parallel to itself as said lift arm (3) is raised and lowered, and a second cross-connected chain transmission (19) having a transmission ratio greater than 1 for causing said sausage meat container (1) to be tipped, the driving sprockets (17,20) of said chain transmissions being mounted on said lift arm axle (4) for free rotation thereabout, and adapted to be alternately coupled thereto for rotation therewith, while the driven sprockets (18,21) are non-rotatably secured to said tipping shaft (5).

2. A machine according to claim 1, characterized in that said two driving sprockets (17,20) and one (18) of said driven sprockets have the same number of teeth, while the driven sprocket (21) of said second chain transmission (19) has a smaller number of teeth than the other sprockets (17,18,20).

3. A machine according to claim 1, characterized in that said two driving sprockets (17,20) are mounted on said lift arm axle (4) at spaced locations, and that an axially shiftable clutch disc (23) is mounted between said driving sprockets (17,20) for rotation in unison with said axle (4).

4. A machine according to claim 3, characterized in that both sides of said clutch disc (23) and the sides of said driving sprockets (17,20) facing said clutch disc (23) are formed with complementary toothed end faces (24), and that the maximum width of said clutch disc (23) approximately corresponds to the clear spacing between said two driving sprockets (17,20).

5. A machine according to claim 4, characterized in that said toothed end faces (24) are formed with flat-topped saw-teeth (25), the inclined flanks (28) of the saw-teeth (25) of the mutually engaged toothed end faces (24) of said clutch disc (23) and one of said driving sprockets extending in the direction of a force created in the respective driving sprocket, while the flat tops (27) of said saw-teeth (25) on the other side of said clutch disc (23) are supported on the flat tops (27) of the saw-teeth (25) of the other driving sprocket, the saw-teeth (25) of said toothed end faces (24) being formed at different spacings, so that mutual engagement of two toothed end faces (24) facing each other is only possible at predetermined positions relative to one another.

6. A machine according to claim 5, characterized in that said force is a tractive force exerted by the respective chain transmission on the driving sprocket engaged with said clutch disc (23) as said lift arm (3) is being raised or lowered, and is effective to automatically shift said clutch disc into engagement with the other of said two driving sprockets.

7. A machine according to claim 5, characterized in that said force is a thrust force resulting from the mutual abutment of two stop members (30) secured to respective ones of said two driving sprockets (17,20), the mutual abutment of said two stop members (30) at the end of a relative movement of said two driving sprockets being effective to positively shift said clutch disc (23).

8. A machine according to claim 1, characterized in that the driving sprocket (17) and/or the driven sprocket (18) of at least one (16) of said two chain transmissions (16,19) is angularly adjustable on its axle (4) or shaft (5), respectively.

9. A machine according to claim 1, characterized in that said lift arm (3) is hollow, said two chain transmissions (16,19) including their sprockets (17,18,20,21) and axle (4) and shaft (5), respectively, being housed in the hollow interior (22) of said lift arm.

10. A machine according to claim 1, characterized in that said carrier frame (6) is designed for positively locked engagement with said sausage meat container (1).

11. A machine according to claim 1, characterized in that the end of said lift arm (3) adjacent the machine is provided with a hollow shaft (15) enveloping said lift arm axle (4) and carrying at its end a crank arm (14) operatively connected to the piston rod (10) of a hydraulic cylinder-piston unit (9).

12. A machine according to claim 11, characterized in that a pivot lever (13) is disposed between said crank arm (14) and the end of said piston rod (10).

13. A machine according to claim 12, characterized in that between said pivot lever (13) and the end of said piston rod (10) there is provided a slide member (11) abutting a vertical guide (12) secured to the machine.

14. A machine according to claim 11, characterized in that the drive mechanism (8) for said lift arm (3) is disposed in a housing (7) mounted on the machine and having an end of said hollow shaft (15) projecting thereinto.

* * * * *